(12) United States Patent
Kweon et al.

(10) Patent No.: US 7,108,944 B2
(45) Date of Patent: Sep. 19, 2006

(54) ACTIVE MATERIAL HAVING SURFACE TREATMENT LAYER FOR BATTERY AND METHOD OF PREPARING THE SAME

(75) Inventors: Ho-Jin Kweon, Cheonan (KR); Jun-Won Suh, Cheonan (KR); Jang-Ho Yoon, Cheonan (KR); Jung-Joon Park, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 131 days.

(21) Appl. No.: 10/189,384

(22) Filed: Jul. 8, 2002

(65) Prior Publication Data
US 2003/0054250 A1    Mar. 20, 2003

(30) Foreign Application Priority Data
Jul. 19, 2001    (KR) .............................. 2001-43554

(51) Int. Cl.
*H01M 4/58* (2006.01)
*H01M 4/60* (2006.01)

(52) U.S. Cl. ............... 429/231.1; 429/216; 429/218.1; 429/231.9

(58) Field of Classification Search ............... 429/216, 429/218.1, 231.1, 21.9, 231.9
See application file for complete search history.

(56) References Cited

U.S. PATENT DOCUMENTS

| 5,292,601 A | 3/1994 | Sugeno et al. | |
|---|---|---|---|
| 5,705,291 A | 1/1998 | Amatucci et al. | |
| 6,475,664 B1 * | 11/2002 | Kawakami et al. | 429/137 |
| 2002/0055042 A1 * | 5/2002 | Kweon et al. | 429/223 |

FOREIGN PATENT DOCUMENTS

| JP | 9-55210 | 2/1997 |
|---|---|---|
| JP | 11-16566 | 1/1999 |
| JP | 11-185758 | 7/1999 |

* cited by examiner

*Primary Examiner*—Dah-Wei Yuan
(74) *Attorney, Agent, or Firm*—Stein, McEwen & Bui, LLP

(57) ABSTRACT

An active material for a battery has a surface treatment layer that includes a conductive agent and at least one coating-element-containing compound selected from the group consisting of a coating-element-containing hydroxide, a coating-element-containing oxyhydroxide, a coating-element-containing oxycarbonate, a coating-element-containing hydroxycarbonate, and a mixture thereof.

45 Claims, 10 Drawing Sheets

FIG.3A
(PRIOR ART)
FIG.3B
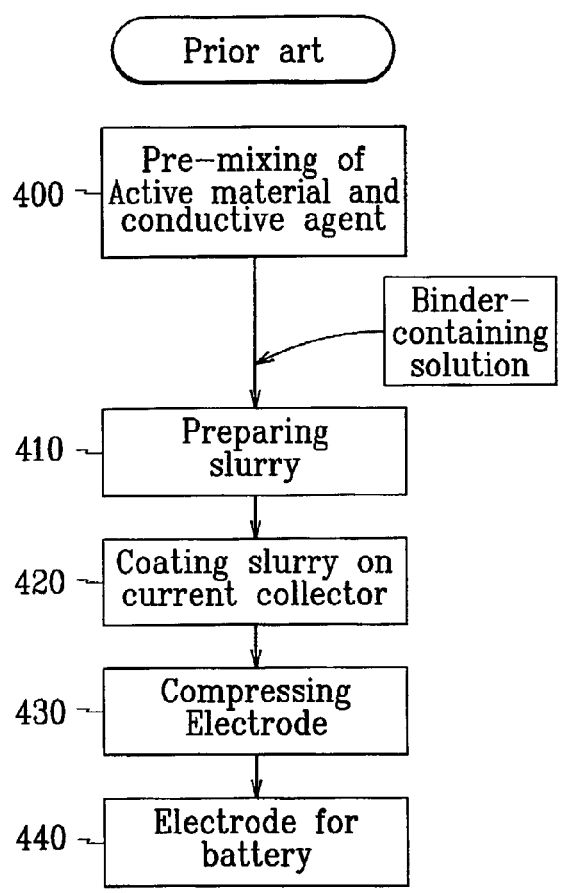
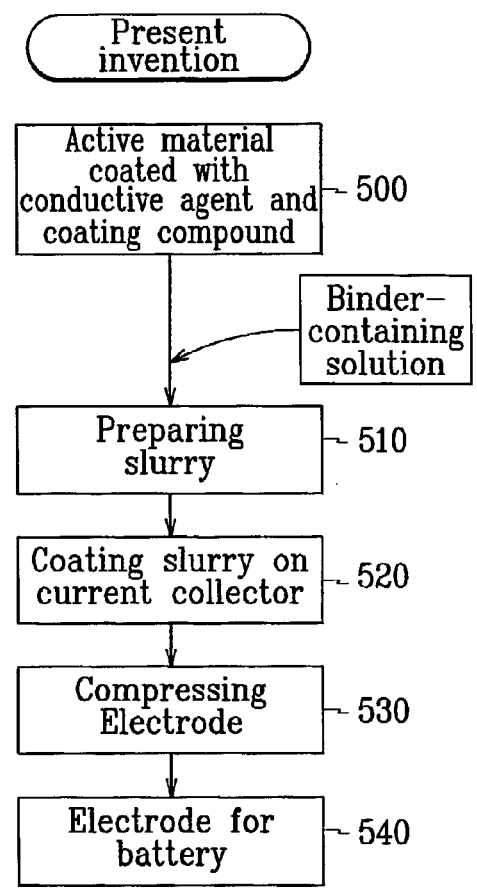

ACTIVE MATERIAL HAVING SURFACE TREATMENT LAYER FOR BATTERY AND METHOD OF PREPARING THE SAME

CROSS REFERENCE TO RELATED APPLICATION

This application is based on Korea Patent Application No. 2001-43554 filed on Jul. 19, 2001 in the Korean Intellectual Property Office, the disclosure of which is incorporated herein by reference.

BACKGROUND OF THE INVENTION

1. Field of the Invention

The present invention relates to an active material for a battery and a method of preparing the same, and more specifically to an active material for a battery with excellent electrochemical characteristics and thermal stability, and a method of preparing the same.

2. Description of the Related Art

Due to recent trends toward more compact and lighter portable electronic equipment, there has been a growing need to develop a high performance and large capacity battery to power this portable electronic equipment. In particular, there has been extensive research to provide such batteries with good safety characteristics and having a low cost.

Generally, batteries are classified as primary batteries, which are used only once before being discarded, and secondary batteries, which are rechargeable for multiple uses. The primary batteries include manganese batteries, alkaline batteries, mercury batteries, silver oxide batteries and so on. The secondary batteries include lead-acid storage batteries, Ni-MH (nickel metal hydride) batteries, nickel-cadmium batteries, lithium metal batteries, lithium ion batteries, lithium polymer batteries, lithium-sulfur batteries and so on.

Lithium ion secondary batteries use materials that reversibly intercalate or deintercalate lithium ions during charge and discharge reactions for both positive and negative active materials, and contain an organic electrolyte or polymer electrolyte between a positive electrode and a negative electrode having the positive and negative active materials, respectively. These batteries generate electrical energy due to changes in chemical potential during the intercalation/deintercalation of the lithium ions at the positive and negative electrodes.

Factors that affect a battery's performance characteristics, such as capacity, cycle life, power capability, safety, and reliability, include electrochemical properties and thermal stability of the active materials that participate in the electrochemical reactions at the positive and negative electrodes. Therefore, there are continuing research efforts to find improvements in the electrochemical properties and thermal stability of the active materials at the positive and negative electrodes.

Of the active materials which have been considered for the active material of the negative electrodes, lithium metal gives both a high cell capacity and a high voltage because the lithium metal has a high electrical capacity per unit mass and a relatively high electronegativity. However, since it is difficult to assure the safety of the battery using lithium metal, a carbonaceous material that is able to intercalate and deintercalate lithium ions is used extensively for the active material of the negative electrodes in lithium secondary batteries. With the use of the carbonaceous material, the battery performance, especially, cycle life and safety, has improved tremendously from that of the lithium metal battery. In order to further improve the negative electrode performance, it has been suggested to add an additive, such as boron, to the carbonaceous material, especially by coating with the additive. For example, a boron-coated graphite (BOC) improves the performance characteristics of the carbonaceous materials.

Lithium metal compounds of a complex formula are often used as a positive active material of the lithium secondary battery. Typical examples include $LiCoO_2$, $LiMn_2O_4$, $LiNiO_2$, $LiNi_{1-x}Co_xO_2 (0<x<1)$, $LiMnO_2$ and a mixture of these compounds. Manganese-based positive active materials such as $LiMn_2O_4$ or $LiMnO_2$ are relatively easy to synthesize, less costly than the other materials, and environmentally friendly. However, these manganese-based materials have a disadvantage in having a relatively low capacity. On the other hand, $LiCoO_2$ has many technical advantages over the other materials such as relatively good cycle life and relatively high specific energy. This compound is presently the most popular material for positive electrodes of commercially available Li-ion batteries. However, it is relatively expensive. While it is desirable to further improve its stability on charge-discharge cycling at a high rate, it is one of the most stable compounds of the presently available positive active materials. $LiNiO_2$ has the highest discharge capacity of all positive active materials mentioned above, but it is difficult to synthesize and is the least stable among the compounds mentioned above.

Among these compounds, $LiCoO_2$ is the most well accepted in the battery industry since its overall performance characteristics, especially, cycle life, are superior to the others. Accordingly, most of the commercially available rechargeable lithium batteries adopt $LiCoO_2$ as the positive active material, although its cost is relatively high. There is a great deal of research effort in the industry to develop a further improved active material in overall performance as well as to reduce the cost, if possible.

One of the previous efforts includes substituting a part of the expensive Co from $LiCoO_2$ with other less expensive metals. For instance, SONY CORPORATION prepared $Li_xCo_{1-y}M_yO_2$ by doping about 1 to 5 percent by weight of $Al_2O_3$ into $LiCoO_2$. A&TB (ASAHI & TOSHIBA BATTERY CO.) prepared an Sn-doped Co-based active material by substituting a part of the Co from $LiCoO_2$ with the Sn.

Another approach is to coat a lithiated compound with a coating material. In U.S. Pat. No. 5,292,601, $Li_xMO_2$ (where M is at least one element selected from Co, Ni, and Mn; and x is 0.5 to 1) is suggested as an improved alternative material over $LiCoO_2$. U.S. Pat. No. 5,705,291 suggests a method in which a composition comprising borate, aluminate, silicate, or mixtures thereof is coated onto the surface of a lithiated intercalation compound.

Japanese Patent Laid-Open No. Hei 9-55210 discloses coating a lithium nickel-based oxide with an alkoxide of Co, Al and Mn, and performing a heat-treatment to prepare a coated positive active material. Japanese Patent Laid-Open No. Hei 11-16566 discloses coating a lithium-metal oxide with another metal and/or an oxide thereof. The another metal includes Ti, Sn, Bi, Cu, Si, Ga, W, Zr, B, and Mo. Japanese Patent Laid-Open No. Hei 11-185758 discloses coating the surface of a lithium manganese oxide with a metal oxide by using a co-precipitation process followed by heat-treating the same to prepare a positive active material.

In the above description, positive active materials of lithium secondary batteries and related examples of developments were explained. Recently, with demands for more compact and light weight portable electronic equipment, various types of batteries including a Li-ion battery have similar demands for an improved active material that can assure good battery performance, safety, and reliability. A great deal of the research and development efforts have been devoted to improvements on performance and thermal stability of the positive active materials to ensure improved cell performance, safety, and reliability of batteries under various use conditions, including many abuse conditions.

SUMMARY OF THE INVENTION

In order to solve the above and other problems, it is an object of the present invention to provide an active material for a battery with good electrochemical characteristics, such as capacity, cycle life, discharge potential, power capability, and other similar electrochemical characteristics.

It is another object to provide a method of preparing an active material with good manufacturing productivity and having an economical preparation process.

It is still another object to provide an electrode with a high energy density.

It is a further object to provide a battery with high battery performance and safety.

Additional objects and advantages of the invention will be set forth in part in the description which follows, and in part, will be obvious from the description, or may be learned by practice of the invention.

In order to accomplish these and other objects, an embodiment of the present invention provides an active material for a battery, the active material having a surface treatment layer comprising a conductive agent and at least one compound selected from the group consisting of a coating-element-containing hydroxide, a coating-element-containing oxyhydroxide, a coating-element-containing oxycarbonate, a coating-element-containing hydroxycarbonate, and a mixture thereof.

According to another embodiment of present invention, a process of preparing an active material for a battery includes adding a conductive agent and a coating-element source to a solvent selected from the group consisting of water, organic solvent, and mixtures thereof to prepare a coating liquid, adding the active material to the coating liquid to coat the active material, and drying the coated active material to form a surface-treatment layer comprising the conductive agent and at least one compound selected from the group consisting of a coating-element-containing hydroxide, a coating-element-containing oxyhydroxide, a coating-element-containing oxycarbonate, a coating-element-containing hydroxycarbonate, and a mixture thereof.

According to a further embodiment of the present invention, an electrode with a high energy density comprises an active material coated with a coating comprising a conductive agent and at least one compound selected from the group consisting of a coating-element-containing hydroxide, a coating-element-containing oxyhydroxide, a coating-element-containing oxycarbonate, a coating-element-containing hydroxycarbonate, and a mixture thereof.

According to yet another embodiment of the present invention, a process of preparing an electrode with a high energy density for a battery includes adding a binder material to a solvent to prepare a binder-containing solution, adding an active material coated with a coating including conductive agent and at least one compound selected from the group consisting of a coating-element-containing hydroxide, a coating-element-containing oxyhydroxide, a coating-element-containing oxycarbonate, a coating-element-containing hydroxycarbonate, and a mixture thereof to the binder-containing solution, to prepare an active material slurry, and casting the active material slurry on a current collector to fabricate an electrode for a battery.

BRIEF DESCRIPTION OF THE DRAWINGS

A more complete appreciation of the invention, and many of the attendant advantages thereof, will become more readily apparent and more readily appreciated as the same becomes better understood by reference to the following detailed description when considered in conjunction with the accompanying drawings, wherein:

FIGS. 3A and 3B are schematic diagrams illustrating production processes of an electrode according to a conventional process and a further embodiment of the present invention;

DETAILED DESCRIPTION OF THE EMBODIMENTS

Figure 1A:
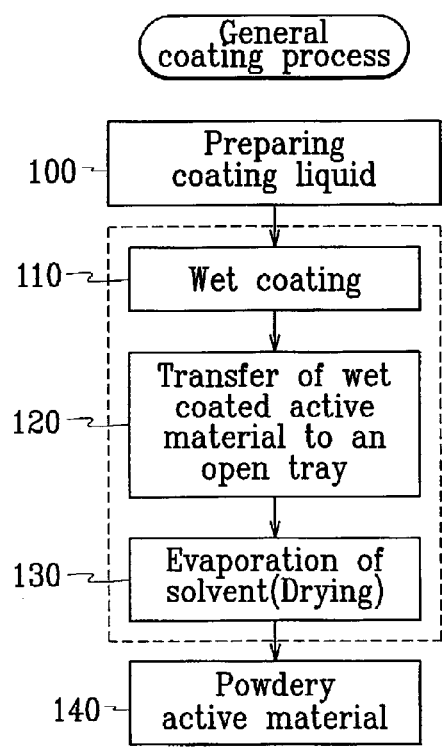
FIGS. 1A and 1B are schematic diagrams illustrating production processes of an active material according to a general process and an embodiment of the present invention (one-shot coating process)

Reference will now be made in detail to the present preferred embodiments of the present invention, examples of which are illustrated in the accompanying drawings and discussed in relation to specific Examples, wherein like reference numerals refer to the like elements throughout. The embodiments are described below in order to explain the present invention by referring to the figures and the specific Examples.

The active material for a battery of the present invention is coated with a surface-treatment layer comprising a conductive agent and at least one compound (hereinafter referred to as a "coating-element-containing compound") selected from the group consisting of a coating-element-containing hydroxide, a coating-element-containing oxyhydroxide, a coating-element-containing oxycarbonate, a coating-element-containing hydroxycarbonate, and a mixture thereof.

The surface treatment (coating) technique of the active material with the conductive agent and the coating-element-containing compound of the present invention may be used for many different types of batteries, and is effective in improving the performance characteristics of active materials for both the positive electrodes and the negative electrodes.

The active material for the surface treatment includes materials that can undergo reversible electrochemical oxidation-reduction reactions. The reversibly oxidizable and reducible materials include a metal, a lithium-containing alloy, sulfur-based compounds, elements or compounds that can reversibly form lithium-containing compounds by a reaction with lithium ions, and all materials that can reversibly intercalate/deintercalate lithium ions (lithiated intercalation compounds), although the present invention is not limited thereto.

According to embodiments of the invention, the metal includes lithium, tin, or titanium, and the lithium-containing alloy includes an alloy comprising lithium and a metal selected from the group consisting of Na, K, Rb, Cs, Fr, Be, Mg, Ca, Sr, Ba, Ra, Al, and Sn. Preferably, the lithium-containing alloy is a lithium/aluminum alloy, a lithium/tin alloy, or a lithium/magnesium alloy. The sulfur-based compound which is the positive active material of the lithium-sulfur battery includes a sulfur element, $Li_2S_n$ ($n \geq 1$), an organosulfur compound, and a carbon-sulfur polymer $((C_2S_x)_n$ where $x=2.5$ to $50$ and $n \geq 2)$. The elements or compounds which can reversibly form a lithium-containing compound by a reaction with lithium ions include silicon, tin oxide ($SnO_2$) and titanium nitrate.

The active material that reversibly intercalates/deintercalates lithium ions (such as lithiated intercalation compounds) includes carbon-based materials, lithium-containing metal oxides, and lithium-containing chalcogenide compounds. The carbon-based material can be amorphous carbon, crystalline carbon, or a mixture thereof. Examples of the amorphous carbon include soft carbon (low temperature calcinated carbon), and hard carbon (high temperature calcinated carbon). Examples of crystalline carbon include natural graphite or artificial graphite which are plate, sphere, or fiber shaped.

A conventional lithium-containing compound (lithium-containing metal oxide and lithium-containing chalcogenide compound) may be used as the lithiated intercalation compound of the present invention. Specific examples are represented in the following formulas (1) to (13):

$$Li_xMn_{1-y}M_yA_2 \quad (1)$$
$$Li_xMn_{1-y}M_yO_{2-z}X_z \quad (2)$$
$$Li_xMn_2O_{4-z}X_z \quad (3)$$
$$Li_xMn_{2-y}M_yA_4 \quad (4)$$
$$Li_xCo_{1-y}M_yA_2 \quad (5)$$
$$Li_xCo_{1-y}M_yO_{2-z}X_z \quad (6)$$
$$Li_xNi_{1-y}M_yA_2 \quad (7)$$
$$Li_xNi_{1-y}M_yO_{2-z}X_z \quad (8)$$
$$Li_xNi_{1-y}Co_yO_{2-z}X_z \quad (9)$$
$$Li_xNi_{1-y-z}Co_yM_zA_\alpha \quad (10)$$
$$Li_xNi_{1-y-z}Co_yM_zO_{2-\alpha}X_\alpha \quad (11)$$
$$Li_xNi_{1-y-z}Mn_yM_zA_\alpha \quad (12)$$
$$Li_xNi_{1-y-z}Mn_yM_zO_{2-\alpha}X_\alpha \quad (13)$$

wherein
$0.95 \leq x \leq 1.1$; $0 \leq y \leq 0.5$; $0 \leq z \leq 0.5$; $0 \leq \alpha \leq 2$;

M is at least one element selected from the group consisting of Al, Ni, Co, Mn, Cr, Fe, Mg, Sr, V, and rare earth elements;

A is at least one element selected from the group consisting of O, F, S, and P; and X is at least one element selected from the group consisting of F, S, and P.

The average particle size of these lithiated intercalation compounds is 1 to 50 μm, and preferably 5 to 20 μm.

In the present invention, a surface-treatment layer comprising the conductive agent and at least one coating-element-containing compound is formed on a surface of the active material. The coating-element-containing compound is selected from the group consisting of a coating-element-containing hydroxide, a coating-element-containing oxyhydroxide, a coating-element-containing oxycarbonate, a coating-element-containing hydroxycarbonate, and a mixture thereof. The coating-element-containing compound has either an amorphous or a crystalline phase.

The coating element is at least one selected from the group consisting of an alkali metal, an alkaline earth metal, a group 13 element, a group 14 element, a group 15 element, and a transition metal. The group 13 element (according to the new IUPAC agreement) refers to the element group of the Periodic Table including Al. The group 14 element (according to the new IUPAC agreement) refers to the element group of the Periodic Table including Si. The group 15 element (according to the new IUPAC agreement) refers to the element group of the Periodic Table including As. In embodiments of the present invention, the coating element includes Mg, Al, Co, K, Na, Ca, Si, Ti, B, As, Zr, Sn, V, Ge, and Ga, or a combination thereof.

The amount of the coating element is $2 \times 10^{-5}$ to 2 wt %, and preferably 0.001 to 2 wt % of the active material. When the amount thereof is below 0.001 wt %, the effect of coating is not sufficiently high, whereas when the amount of the coating element is above 2 wt %, the electrode capacity is reduced due to the added weight of the coating element.

The conductive agent in the surface treatment layer of the active material is selected from a carbon-based conductive agent, a graphite-based conductive agent, a metal-based conductive agent, or a metallic compound-based conductive agent, but it is not limited thereto.

KS6 (produced by the TIMCAL company) is a graphite-based conductive agent according to an embodiment of the present invention. The carbon-based conductive agent may be selected from the group consisting of Super P (produced by the MMM company), ketchen black, denka black, acetylene black, carbon black, thermal black, channel black, and activated carbon. The metal-based conductive agent may be one or more of powdery Pt, Ru, Ni, Ti, La, or Sn. The metallic compound-based conductive agent may be selected from the group consisting of tin oxide, tin phosphate ($SnPO_4$), titanium oxide, and perovskite such as $LaSrCoO_3$, $LaSrMnO_3$, etc. Any one or more of these, graphite, carbon, metal or metallic compound-based conductive agents may be used for the coating.

An amount of the conductive agent in the surface-treatment layer is in the range of 0.5 to 10 wt % of the active material, and preferably in the range of 1 to 5 wt %. When the amount of the conductive agent is less than 0.5 wt %, the conductivity of the slurry-coated active material composite may be reduced to a below-adequate level resulting in deterioration of the electrochemical characteristics such as cycle life and high rate capability. When the amount of the conductive agent is more than 10 wt %, the energy density per weight of the electrode, therefore that of the cell, decreases significantly.

A thickness of the surface-treatment layer is 1 to 300 nm, preferably 1 to 100 nm, and more preferably 1 to 50 nm. When the thickness is less than 1 nm, the effect of the surface-treatment layer on the battery performance is insignificant. If the thickness is more than 300 nm, the thickness is too thick to facilitate the movement of $Li^+$ ions through the coating layer and to improve the battery performance.

The surface-treated active material is prepared through the preparation method comprising adding a conductive agent and a coating-element source to a solvent selected from the group consisting of water, organic solvent, and mixtures thereof to prepare a coating liquid. An active material is added to the coating liquid to coat the material. The coated active material is dried to form a surface-treatment layer on the active material.

Specifically, the coating liquid used in coating the active material is prepared by adding a conductive agent and a coating-element source to a solvent, if necessary by using a reflux technique, to form a solution or a suspension. A "coating liquid" generally refers to a homogeneous suspension or a solution.

The solvents include an organic solvent or water. The coating-element source includes any coating-element or any coating-element-containing compound that is soluble in the solvent (i.e., an organic solvent or water). As described above, the coating-element source includes a coating element such as an alkali metal, an alkaline earth metal, a group 13 element, a group 14 element, a group 15 element, and a transition metal. According to an embodiment of the invention, the coating element source includes at least one selected from the group consisting of Mg, Al, Co, K, Na, Ca, Si, Ti, B, As, Zr, Sn, V, Ge, and Ga, or a combination thereof, and preferably, Al or B.

The coating-element source includes a coating-element, a coating-element-containing alkoxide such as methoxide, ethoxide, or isopropoxide, a coating-element-containing salt, or a coating-element-containing oxide. Since the solubility of the coating-element source largely depends upon the type of solvent, one having ordinary skill in the art can easily choose a suitable coating-element source from the group consisting of the coating element itself and the coating-element-containing alkoxide, the coating-element-containing salt, or the coating-element-containing oxide by considering the type of solvent. For example, if an organic solvent is used as the solvent for the coating liquid, the coating element, the coating-element-containing alkoxide, the coating-element-containing salt, or the coating-element-containing oxide may be chosen such that it is dissolved in the organic solvent, using a reflux method if necessary. Alternatively, if water is used as the solvent, either the coating-element-containing salt or the coating-element-containing oxide may be used to prepare the coating liquid. For an example of the coating-element source, tetraethyl orthosilicate may be used as a silicon source, whereas $B_2O_3$, $H_3BO_3$, or $HB(OH)_2$ can be used as a boron source. $HB(OH)_2$ is prepared by dissolving $B_2O_3$ in an organic solvent or water followed by drying the liquid. When vanadium is used as a coating-element, vanadium oxide ($V_2O_5$) or a vanadate such as ammonium vanadate ($NH_4(VO)_3$) may be examples of the coating element source.

Examples of the organic solvents according to embodiments of the invention include, but are not limited to, alcohols such as methanol, ethanol, or isopropanol. Other solvents according to embodiments of the invention include hexane, chloroform, tetrahydrofuran, ether, methylene chloride, and acetone.

An amount of the coating-element source is 0.1 to 50 wt % and preferably 5 to 30 wt % of the coating solution according to an embodiment of the invention. When the amount thereof is below 0.1 wt %, coating is not fully effective, whereas when the amount of the coating-element source is more than 50 wt %, the thickness of the resultant surface-treatment layer is difficult to control evenly.

The active material powder is surface-treated (coated) using the coating liquid described above. The coating liquid includes a conductive agent and a coating-element source. The coating process is performed by a dipping method according to an embodiment of the invention. The dipping method includes dipping the active material in the coating liquid, removing any excess liquid, if necessary, and then drying the dipped active material. Generally, the dip coating method is used, but it is understood other methods can be used.

According to another embodiment of the invention, the coating process is performed using a single continuous process (hereafter referred to as a "one-shot coating process"). In the one-shot coating process, the mixing of the active material with the coating liquid, the solvent-removing, and the drying take place in a single process vessel. The one-shot coating process is relatively simple, thereby reducing production cost and making a uniform surface-treatment layer on the active material particles.

Figure 1B:
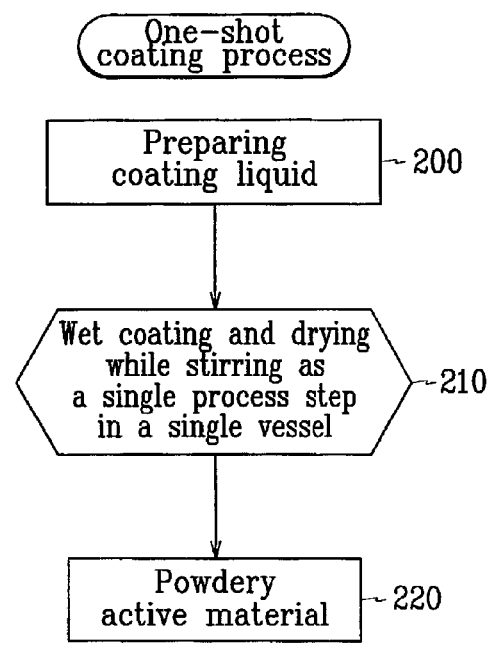

The one-shot coating process will be illustrated in further detail. For a better understanding, the coating process using the one-shot coating process is schematically shown in FIG. 1B in comparison with the general coating process shown in FIG. 1A used for production of the coated active material for a lithium ion battery. As shown in FIG. 1A, the general coating technique includes multiple process-operations as described below. In operation 100, an active material is added to the coating liquid in a mixer. The mixer mixes the active material and the coating liquid well to coat the active material with the coating liquid in operation 110. In operation 120, the resulting wet active material with the coating liquid is transferred to a shallow tray to remove the solvent by evaporation. In operation 130, the coated active material is dried in the air at an elevated temperature (for example 80 to 100° C.) to produce the active material 140.

Figure 2:
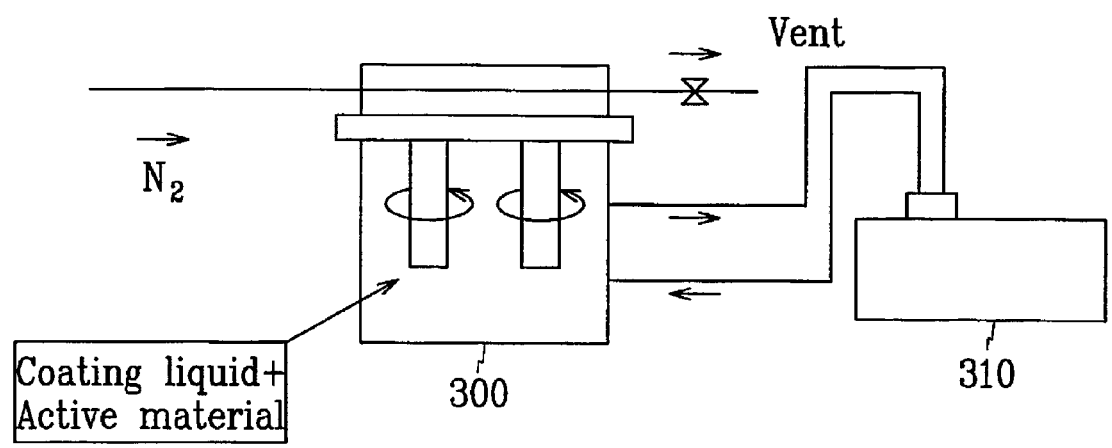
FIG. 2 is a schematic diagram showing an apparatus used in a coating process according to another embodiment of the present invention.

On the other hand, the one-shot coating process involves preparing a coating liquid (operation 200), putting the coating liquid and the active material into a mixer and raising the temperature of the mixer while the contents are being agitated during mixing (operation 210). Simultaneously, a purging gas is introduced into the mixing apparatus 300, which is schematically shown in FIG. 2. The purging gas facilitates evaporation of the solvent of the coating liquid and purges impure gases that may be present in the mixer.

The purging gas may be $CO_2$, or a moisture-free inert gas such as nitrogen or argon. In this coating operation, the active material is coated with the coating liquid in the mixer 300, and the solvent of the coating liquid is evaporated and removed while the process mixture is being continuously stirred. The solvent removal process occurs as the temperature is raised.

Therefore, the transfer of the liquid-coated wet active material to another vessel (a tray) and the separate drying operation (operations 120 and 130) in the tray can be combined into a single continuous process step in a single vessel. After putting the active material and the coating liquid in the mixer 300, a premixing process may be further performed for 10 to 30 minutes to obtain a uniform mixture.

The temperature of the mixer 300 is raised to 50 to 100° C., for example, by circulating hot water through the outside wall of the mixer 300 to accelerate evaporation of the solvent such as alcohol or water using a heat exchanger 310. The type of mixer 300 is not limited to any one type as long as it is capable of mixing the active material with the coating liquid effectively, injecting the purging gas if used, and raising the temperature to a desired value. A representative example of the mixer 300 is a planetary mixer.

Subsequent to the wet coating, the coated active material is dried to form the resultant active material 140 or 220 for a battery of the present invention. The resultant active material includes the surface-treatment layer comprising a conductive agent and a coating-element-containing compound such as a coating-element-containing hydroxide, a coating-element-containing oxyhydroxide, a coating-element-containing oxycarbonate, a coating-element-containing hydroxycarbonate, and a mixture thereof.

The drying operations is preferably performed at a temperature in the range of room temperature (i.e., roughly 20° C.) to 200° C., for 1 to 24 hours. When the drying temperature is lower than room temperature, the drying time is unduly prolonged. If the drying temperature is higher than 200° C., the desired quality of the surface-treatment layer may not be achieved. When the drying duration is shorter than 1 hour or longer than 24 hours, the desired quality of the surface-treatment layer may not be obtained due to the formation of an undesirable crystal structure or morphology.

When using the one-shot coating process in FIG. 1B, a separate drying operation 130 of FIG. 1A is not necessary after the coating process 110 of FIG. 1A because the drying operation is performed simultaneously with the coating operation.

During the drying operation 210, the coating element in the coating liquid on the surface of the active material may react with moisture in the atmosphere to produce a hydroxide. Thus, the surface-treatment layer may include a new amorphous or crystalline coating-element-containing hydroxide formed on the surface. During the drying operation, the surface-treatment layer may also produce a coating-element-containing oxyhydroxide, a coating-element-containing oxycarbonate, or a coating-element-containing hydroxidecarbonate due to a partial dehydration of the coating-element-containing hydroxides, reaction with atmospheric carbon dioxide ($CO_2$) or both.

The final form of the active material is coated with the surface-treatment layer including coating-element-containing compound and a conductive agent. The coated active material powder may or may not be sieved to obtain a powder with a desirable average diameter. Where there is no sieving, the same material that is included in the surface-treatment layer remains in the active material slurry. The remaining material in the slurry improves the thermal stability of the electrode.

Since the surface-treatment layer including the conductive agent is formed on the active material, the internal resistance is improved significantly in a battery cell containing the surface-treated active material as opposed to a battery cell without the coating. Thus, the charge and discharge-potential characteristics, including overpotential on charging and voltage depression on discharging, are improved significantly in the battery with the coated active material. It is thereby anticipated to enhance the power capability of the battery cell and also provide good cycle-life of the battery cell.

In accordance with another preferred embodiment, the present invention also provides a high density active material composite for the electrode for the battery. The conventional preparation process of an electrode for a lithium ion battery is compared with an electrode preparation process of the present invention in FIGS. 3A and 3B.

As shown in FIG. 3A, an electrode of the prior art is generally fabricated by casting (coating) a slurry of an active material on a current collector (operations 400 to 420) and then compressing it (operation 430). The slurry is prepared by dry mixing an active material and a conductive agent followed by adding the mixture to a binder-containing solution (operations 400 and 410). The conductive agent has a large surface area over 2500 $m^2/g$ and a high volume resulting in a low density active material composite on the electrode. The resultant electrode shows a reduced energy density.

In the present invention, however, the electrode is fabricated by suspending the conductive agent-coated active material in a binder-containing solution to prepare the active material slurry followed by casting the slurry on a current collector and compressing it as shown in operations 500 to 540 of FIG. 3B. The binder-containing solution is prepared by adding a binder material to any conventional solvent used for the conventional active material slurry, such as N-methyl pyrrolidone (NMP). The contents of the active material, binder material, and solvent should be appropriate to provide a suitable viscosity so that the active material slurry can be readily cast on the current collector.

In the embodiment of the present invention, a reduced amount of the conductive agent can provide the active material composite with a comparable conductivity of the composition prepared by the state-of-the-art process containing an excess amount of the conductive agent. This improvement is mainly due to the intimate contact of the conductive agent with the active material particles by the nature of the coating.

The reason of the improvement described above is illustrated schematically in FIGS. 4A and 4B. In the active material composite by the state-of-the-art process as shown schematically in FIG. 4A, the active material particles 1 and the conductive agent particles 2 are rather loosely distributed so that the overall density of the active material composite is not as high as the active material composite of the present invention as shown in FIG. 4B. As shown in FIG. 4B, the active material particles 10 and the conductive agent particles 30 are distributed rather compactly in the composite. The conductive agent particles 30 are held in position tightly by the coating-element-containing compound 20. As the result of such compact particle distributions, the present invention provides a battery with a high energy density (energy per unit volume) of the electrode and therefore provides a high energy density battery.

Figure 4A:
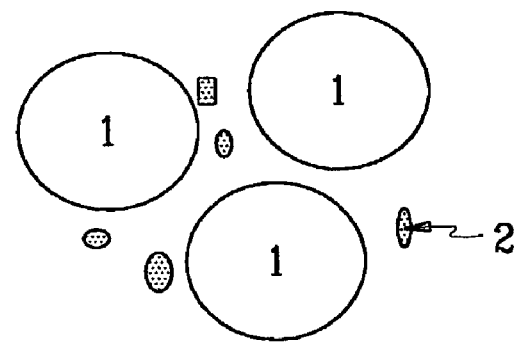
FIG. 4A is a schematic illustration showing the distribution of an active material and a conductive agent in an electrode prepared according to a conventional process.
Figure 4B:
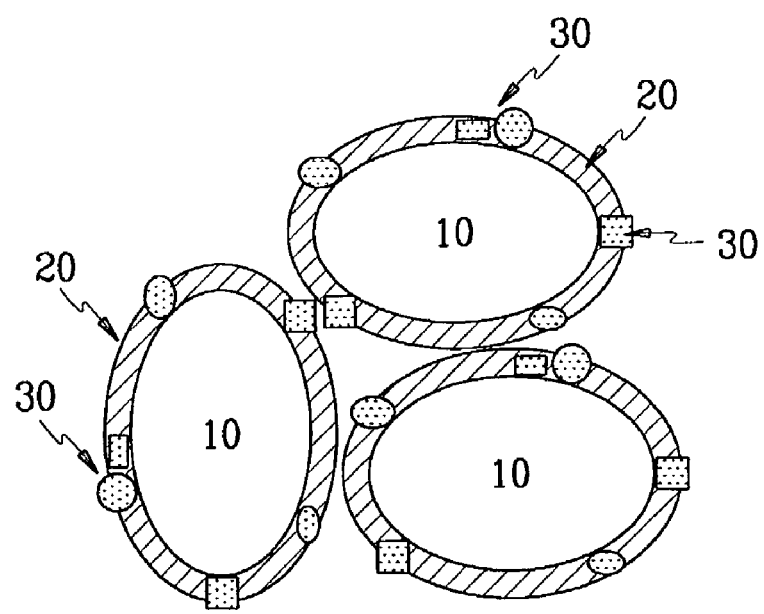
FIG. 4B is a schematic illustration showing an active material prepared according to an embodiment of the present invention.

In addition, in FIG. 4A, the active material particles 1 and the conductive agent particles 2 are not intimately in contact with each other. Thus, there is a reduced efficiency in conductivity by the conductive agent 2 as compared with the active material composite of the present invention as shown in FIG. 4B. As shown in FIG. 4B, the active material particles 10 and the conductive agent particles 30 are in intimate contact with each other. As the result of such intimate contacts, a smaller weight portion of the conductive agent is needed in the active material composite of the present invention as opposed to the weight needed for the state-of-the-art process to provide the active material composite with an equivalent conductivity. Therefore, the specific energy (energy per unit weight) of the electrode by the present invention is improved over that of the state-of-the-art process.

Another advantage of the present invention is a reduction in the processing time of the electrode preparation. This reduction saves a significant production cost by eliminating a powder mixing process operation from the state-of-the-art process as shown in FIGS. 3A and 3B.

Still another advantage of the present invention is that the chemical and/or electrochemical stability of the electrolyte/active material interface is improved substantially by the presence of the coating-element-containing compound 20 as shown in FIG. 4B. The improved stability, in turn, improves the cycle life of the electrode as well as reduces undesirable gas generation in the cell which builds up the internal pressure of the cell. These improvements in cycle life as well as in the gas generation are due to a reduction in irreversible oxidation reactions of the electrolyte at the surface of the charged active material by the presence of the coating layer.

Other important characteristics of a commercially viable battery are its safety characteristics. The battery is required to be safe in using in occasional, abusive conditions. These abuses are due to mechanical, electrical and thermal abuses. Examples of mechanical abuse tests include a nail penetration test, in which a metallic nail penetrates into a fully charged cell, a mechanical crush test of the charged cell, and other similar tests. Examples of electrical abuse tests include an overcharge test at various charge rates, and over-discharge test, and other similar tests. These safety characteristics of the battery are closely related to an exothermic reaction of the charged active material and the electrolyte.

The rate of such an exothermic reaction is usually measured using a differential scanning calorimetry (DSC). For example, a coin-type half-cell with a $LiCoO_2$ active material is charged to a pre-determined potential to convert $LiCoO_2$ to $Li_{1-x}CoO_2$, where x is close to 0.5. A small piece of the charged electrode from the cell is subjected to a DSC test to evaluate the thermal stability of the charged active material. Namely, the thermal stability of the active material is evaluated by an exothermic starting temperature and a quantity of heat evolution from the DSC measurement. Because the $Li_1CoO_2$ active material is an unstable compound, oxygen is bonded to the metal (Co—O) until a certain value of temperature (exothermic peak), at which it decomposes as the temperature increases and gaseous oxygen is released. The released oxygen may react with the electrolyte in a cell to cause a pressure build-up in the cell and, in the worst case, leads to an explosion. Accordingly, the exothermic peak temperature and the quantity of heat evolved are closely related to the safety.

The active material of the present invention has a relatively high exothermic starting temperature and a small quantity of heat evolution during the exothermic reaction. Thus, the active material of the present invention exhibits superior thermal stability as compared to a conventional active material.

The present invention is further explained in more detail with reference to the following specific examples. These specific examples, however, should not in any sense be interpreted as limiting the scope of the present invention.

COMPARATIVE EXAMPLE 1

$LiCoO_2$ powder for a positive active material (average particle diameter: 10 μm) and Super P for a conductive agent were pre-mixed. The resultant mixture was added to a polyvinylidene fluoride binder solution. The weight ratio of $LiCoO_2$ powder, Super P, and polyvinylidene fluoride was 94:3:3. The mixture was mixed in an appropriate amount of N-methyl pyrrolidone (NMP) solvent thoroughly for 2 hours and aged for 1 hour, to prepare a positive active material slurry. The positive active material slurry was cast onto an Al foil to a thickness of about 100 μm, followed by drying and compressing the coated Al foil. The resultant slurry-coated Al foil was cut into a disk having a diameter of 1.6 cm to prepare a positive electrode.

Using the positive electrode and a lithium counter electrode, a coin-type half-cell was fabricated in an Ar-purged glove box. For the electrolyte, a 1 M $LiPF_6$ solution in ethylene carbonate and dimethyl carbonate (1:1 volume ratio) was used.

COMPARATIVE EXAMPLE 2

A coin-type half-cell was fabricated by the same procedure as in Comparative Example 1, except that $LiMn_2O_4$ (average particle diameter: 15 μm) powder was used instead of the $LiCoO_2$ powder.

COMPARATIVE EXAMPLE 3

A coin-type half-cell was fabricated by the same procedure as in Comparative Example 1, except that $LiNi_{0.9}Sr_{0.002}Co_{0.1}O_2$ (average particle diameter: 10 μm) powder was used instead of the $LiCoO_2$ powder.

COMPARATIVE EXAMPLE 4

A coin-type half-cell was fabricated by the same procedure as in Comparative Example 1, except that $LiNi_{0.66}Mn_{0.25}Al_{0.05}Co_{0.1}O_2$ (average particle diameter: 10 μm) powder was used instead of the $LiCoO_2$ powder.

COMPARATIVE EXAMPLE 5

A coin-type half-cell was fabricated by the same procedure as in Comparative Example 1, except that the $LiCoO_2$ powder, Super P, and polyvinylidene fluoride were mixed in the weight ratio of 96:2:2.

REFERENCE EXAMPLE 1

A 1 wt % Al-isopropoxide coating suspension was prepared by adding 2 g of Al-isopropoxide powder to 198 g of ethanol. 1 kg of the $LiCoO_2$ powder (average particle diameter: 10 μm) was added to 200 g of the Al-isopropoxide coating suspension, followed by mixing it thoroughly for about 10 minutes in a mixer with a water-jacketed heat exchanger to coat the surface of the $LiCoO_2$ powder with the suspension. Purging nitrogen gas was injected into the mixer while the mixer chamber temperature was kept at 60° C. by circulating hot water through the heat exchanger. The mixture was stirred continuously for an additional 1 hour while dry nitrogen gas was flowing continuously to remove the ethanol by evaporation and to thereby obtain a coated LiCoO$_2$ active material powder with a layer of AlO(OH).

The coated LiCoO$_2$ powder and the Super P for a conductive agent were pre-mixed, and the resultant mixture was added to a polyvinylidene fluoride binder solution. The weight ratio of the coated LiCoO$_2$ powder, the Super P, and polyvinylidene fluoride was 94:3:3. The mixture in an appropriate amount of the N-methyl pyrrolidone (NMP) solvent was mixed thoroughly, to prepare a positive active material slurry. The positive active material slurry was cast onto an Al foil in a thickness of about 100 μm followed by drying and compressing the coated Al foil. The resultant slurry-coated Al foil was cut into a disk having a diameter of 1.6 cm to prepare a positive electrode.

Using the positive electrode and the lithium counter electrode, a coin-type half-cell was fabricated in an Ar-purged glove box. For the electrolyte, a 1 M LiPF$_6$ solution in ethylene carbonate and dimethyl carbonate (1:1 volume ratio) was used.

REFERENCE EXAMPLE 2

A coin-type half-cell was fabricated by the same procedure as in Reference Example 1, except that a 5 wt % Al-isopropoxide coating suspension was used instead of the 1 wt % Al-isopropoxide coating suspension.

REFERENCE EXAMPLE 3

A coin-type half-cell was fabricated by the same procedure as in Reference Example 1, except that a 10 wt % Al-isopropoxide coating suspension was used instead of the 1 wt % Al-isopropoxide coating suspension.

REFERENCE EXAMPLE 4

A coin-type half-cell was fabricated by the same procedure as in Reference Example 1, except that the coated LiCoO$_2$ powder, the Super P, and the polyvinylidene fluoride were mixed in the weight ratio of 96:2:2.

REFERENCE EXAMPLE 5

A coin-type half-cell was fabricated by the same procedure as in Reference Example 1, except that the coated LiCoO$_2$ powder, the Super P, and the polyvinylidene fluoride were mixed in the weight ratio of 96:1:3.

REFERENCE EXAMPLE 6

A coin-type half-cell was fabricated by the same procedure as in Reference Example 1, except that LiMn$_2$O$_4$ (average particle diameter: 15 μm) powder was used instead of the LiCoO$_2$ powder.

REFERENCE EXAMPLE 7

A coin-type half-cell was fabricated by the same procedure as in Reference Example 1, except that LiMn$_2$O$_4$ (average particle diameter: 15 μm) powder was used instead of the LiCoO$_2$ powder, and the coated LiMn$_2$O$_4$ powder, the Super P, and the polyvinylidene fluoride were mixed in the weight ratio of 96:1:3.

REFERENCE EXAMPLE 8

A coin-type half-cell was fabricated by the same procedure as in Reference Example 1, except that LiNi$_{0.9}$Sr$_{0.002}$Co$_{0.1}$O$_2$ (average particle diameter: 10 μm) powder was used instead of the LiCoO$_2$ powder.

REFERENCE EXAMPLE 9

A coin-type half-cell was fabricated by the same procedure as in Reference Example 1, except that Li Ni$_{0.9}$Sr$_{0.002}$Co$_{0.1}$O$_2$ (average particle diameter: 10 μm) powder was used instead of the LiCoO$_2$ powder, and the coated LiNi$_{0.9}$Sr$_{0.002}$Co$_{0.1}$O$_2$ powder, the Super P, and the polyvinylidene fluoride were mixed in the weight ratio of 96:1:3.

REFERENCE EXAMPLE 10

A coin-type half-cell was fabricated by the same procedure as in Reference Example 1, except that LiNi$_{0.66}$Mn$_{0.25}$Al$_{0.05}$Co$_{0.1}$O$_2$ (average particle diameter: 10 μm) powder was used instead of the LiCoO$_2$ powder.

REFERENCE EXAMPLE 11

A coin-type half-cell was fabricated by the same procedure as in Reference Example 1, except that LiNi$_{0.66}$Mn$_{0.25}$Al$_{0.05}$Co$_{0.1}$O$_2$ (average particle diameter: 10 μm) powder was used instead of the LiCoO$_2$ powder, and the coated LiNi$_{0.66}$Mn$_{0.25}$Al$_{0.05}$Co$_{0.1}$O$_2$ powder, the Super P and the polyvinylidene fluoride were mixed in the weight ratio of 96:1:3.

REFERENCE EXAMPLE 12

A coin-type half-cell was fabricated by the same procedure as in Reference Example 1, except that a 5 wt % boron ethoxide suspension, which was prepared by adding 10 g of B$_2$O$_3$ powder to 190 g of the ethanol was used, and the resulting LiCoO$_2$ had a coating layer of HB(OH)$_2$.

REFERENCE EXAMPLE 13

A coin-type half-cell was fabricated by the same procedure as in Reference Example 1, except that a 10 wt % boron ethoxide suspension, which was prepared by adding 20 g of B$_2$O$_3$ powder to 180 g of the ethanol was used, and the resulting LiCoO$_2$ had a coating layer of HB(OH)$_2$, and the coated LiCoO$_2$ powder, the Super P, and the polyvinylidene fluoride were mixed in the weight ratio of 96:1:3.

EXAMPLE 1

4 g of Al-isopropoxide powder was added to 396 g of ethanol to prepare 400 g of Al-isopropoxide suspension. 63.8 g of the Super P and 800 g of the ethanol were added to the Al-isopropoxide suspension to prepare a coating liquid. Using the coating liquid, the LiCoO$_2$ powder (average particle diameter: 10 μm) having a surface-treatment layer comprising a coating layer of the AlO(OH) and the Super P on the surface thereof was produced by the same procedure as in coating process of Reference Example 1. The amount of the Al was 0.2 wt % of the total active material weight and the amount of the Super P was 3 wt % of the total active material weight.

The coated LiCoO$_2$ powder was suspended in a solution of polyvinylidene fluoride binder in N-methyl pyrrolidone solvent to prepare a positive active material slurry. The slurry contained the coated LiCoO$_2$ powder and the polyvinylidene fluoride in the weight ratio of 97:3 with an appropriate amount of the N-methyl pyrrolidone solvent. The positive active material slurry was cast onto an Al foil in a thickness of about 100 μm followed by drying and compressing the coated Al foil. The resultant slurry-coated Al foil was cut into a disk having a diameter of 1.6 cm to prepare a positive electrode.

Using the positive electrode and a lithium metal counter electrode, a coin-type half-cell was fabricated in an Ar-purged glove box. For the electrolyte, a 1 M LiPF$_6$ solution in a mixed solvent of ethylene carbonate (EC) and dimethyl carbonate (DMC) in the volume ratio of 1:1 was used.

EXAMPLE 2

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 63.8 g of the Super P and 800 g of ethanol to the suspension. The amount of the Al in the coated LiCoO$_2$ powder was 1 wt % of the total active material weight, and the amount of the Super P was 3 wt % of the total active material weight.

EXAMPLE 3

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 41.6 g of the Super P and 800 g of the ethanol to the suspension. The positive active material slurry contained the coated LiCoO$_2$ and the polyvinylidene fluoride in a weight ratio of 98:2 with an appropriate amount of the N-methyl pyrrolidone solvent. The amount of Al in the coated LiCoO$_2$ powder was 1 wt % of the total active material weight, and the amount of the Super P was 2 wt % of the total active material weight.

EXAMPLE 4

A coin-type half-cell was fabricated by the same procedure as in Example 1, except that the coating liquid was prepared by adding 40 g of the Al-isopropoxide powder to 360 g of the ethanol to prepare 400 g of the Al-isopropoxide suspension, followed by adding 63.8 g of the Super P and 800 g of the ethanol to the suspension. The amount of the Al in the coated LiCoO$_2$ powder was 2 wt % of the total active material weight, and the amount of the Super P was 3 wt % of the total active material weight.

EXAMPLE 5

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 20.8 g of the Super P and 800 g of the ethanol to the suspension. The amount of the Al in the coated LiCoO$_2$ powder was 1 wt % of the total active material weight, and the amount of the Super P was 1 wt % of the total active material weight.

EXAMPLE 6

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 63.8 g of the Super P and 800 g of the ethanol to the suspension, and a LiMn$_2$O$_4$ (average particle diameter: 15 μm) powder was used instead of the LiCoO$_2$ powder. The amount of the Al in the coated LiMn$_2$O$_4$ was 1 wt % of the total active material weight, and the amount of the Super P was 3 wt % of the total active material weight.

EXAMPLE 7

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 20.8 g of the Super P and 800 g of the ethanol to the suspension, and a LiMn$_2$O$_4$ (average particle diameter: 15 μm) powder was used instead of the LiCoO$_2$ powder. The amount of the Al in the coated LiMn$_2$O$_4$ was 1 wt % of the total active material weight, and the amount of the Super P was 1 wt % of the total active material weight.

EXAMPLE 8

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 63.8 g of the Super P and 800 g of the ethanol to the suspension, and a LiNi$_{0.9}$Sr$_{0.002}$CoO$_{102}$ (average particle diameter: 10 μm) powder was used instead of the LiCoO$_2$ powder. The amount of the Al in the coated LiNi$_{0.9}$Sr$_{0.002}$CO$_{0.1}$O$_2$, was 1 wt % of the total active material weight, and the amount of the Super P was 3 wt % of the total active material weight.

EXAMPLE 9

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 20.8 g of the Super P and 800 g of the ethanol to the suspension, and a LiNi$_{0.9}$Sr$_{0.002}$Co$_{0.1}$O$_2$ (average particle diameter: 10 μm) powder was used instead of the LiCoO$_2$ powder. The amount of the Al in the coated LiNi$_{0.9}$Sr$_{0.002}$Co$_{0.1}$O$_2$ was 1 wt % of the total active material weight, and the amount of the Super P was 1 wt % of the total active material weight.

EXAMPLE 10

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 63.8 g of the Super P and 800 g of the ethanol to the suspension, and a LiNi$_{0.66}$Mn$_{0.25}$Al$_{0.05}$Co$_{0.1}$O$_2$ (average particle diameter: 10 μm) powder was used instead of the LiCoO$_2$ powder the amount of the Al in the coated LiNi$_{0.66}$Mn$_{0.25}$Al$_{0.05}$Co$_{0.1}$O$_2$ was 1 wt of the total active material weight, and the amount of the Super P was 3 wt % of the total active material weight.

EXAMPLE 11

A coin-type half-cell was fabricated by the same procedure as in Example 1, except that the coating liquid was prepared by adding 20 g of the Al-isopropoxide powder to 380 g of the ethanol to prepare 400 g of the Al-isopropoxide suspension, followed by adding 20.8 g of the Super P and 800 g of ethanol to the suspension, and a $LiNi_{0.66}Mn_{0.25}Al_{0.05}Co_{0.1}O_2$ (average particle diameter: 10 μm) was used instead of the $LiCoO_2$ powder. The amount of the Al in the coated $LiNi_{0.66}Mn_{0.25}Al_{0.05}Co_{0.1}O_2$ was 1 wt % of the total active material weight, and the amount of the Super P was 1 wt % of the total active material weight.

EXAMPLE 12

A coin-type half-cell was fabricated by the same procedure as in Example 1, except that the coating liquid was prepared by adding 20 g of $B_2O_3$ powder to 380 g of the ethanol to prepare 400 g of boron ethoxide suspension, followed by adding 63.8 g of the Super P and 800 g of the ethanol to the suspension, and the resulting $LiCoO_2$ had a coating layer of $HB(OH)_2$. The amount of the B In the coated $LiCoO_2$ was 1 % of the total active material weight, and the amount of the Super P was 3 wt % of the total active material weight.

EXAMPLE 13

A coin-type half-cell was fabricated by the same procedure as in Example 1, except that the coating liquid was prepared by adding 40 g of the $B_2O_3$ powder to 360 g of the ethanol to prepare 400 g of boron ethoxide suspension, followed by adding 20.8 g of the Super P and 800 g of the ethanol to the suspension, and the resulting $LiCoO_2$ had a coating layer of $HB(OH)_2$. The amount of the B in the coated $LiCoO_2$ was 2 wt % of the total active material weight, and the amount of the Super P was 1 wt % of the total active material weight.

EXAMPLE 14

A coin-type half-cell was fabricated by the same procedure as in Example 1, except that the coating liquid was prepared by adding 4 g of $Al(NO_3)_3$ powder to 396 g of water to prepare 400 g of $Al(NO_3)_3$ suspension, followed by adding 63.8 g of the Super P and 800 g of the water to the suspension. The amount of the Al in the coated $LiCoO_2$ was 0.2 wt % of the total active material weight, and the amount of the Super P was 3 wt % of the total active material weight.

EXAMPLE 15

A coin-type half-cell was fabricated by the same procedure as in Example 1, except that the coating liquid was prepared by adding 20 g of the $Al(NO_3)_3$ powder to 380 g of the water to prepare 400 g of the $Al(NO_3)_3$ suspension, followed by adding 63.8 g of the Super P and 800 g of the water to the suspension. The amount of the Al in the coated $LiCoO_2$ was 1 wt % of the total active material weight, and the amount of the Super P was 3 wt % of the total active material weight.

EXAMPLE 16

A coin-type half-cell was fabricated by the same procedure as in Example 1, except that the coating liquid was prepared by adding 40 g of $Al(NO_3)_3$ powder to 360 g of water to prepare 400 g of $Al(NO_3)_3$ suspension, followed by adding 63.8 g of Super P and 800 g of water to the suspension. The amount of Al in the coated $LiCoO_2$ was 2 wt % of the total active material weight, and the amount of Super P was 3 wt % of the total active material weight.

EXAMPLE 17

A coin-type half-cell was fabricated by the same procedure as in Example 1, except that artificial graphite powder was used instead of the $LiCoO_2$ powder.

EXAMPLE 18

A coin-type half-cell was fabricated by the same procedure as in Example 1, except that natural graphite powder was used instead of the $LiCoO_2$ powder.

EXAMPLE 19

A coin-type half-cell was fabricated by the same procedure as in Example 1, except that $SnO_2$ powder was used instead of the $LiCoO_2$ powder.

EXAMPLE 20

A coin-type half-cell was fabricated by the same procedure as in Example 1, except that powdery silicon (Si) active material was used instead of the $LiCoO_2$ powder.

The time taken to produce a slurry used during the fabrication of electrodes for cells using 2 kg of the active materials according to Comparative Example 1, Reference Example 5, and Example 5 are as shown in Table 1.

TABLE 1

| | Premixing time of active material and conductive agent (in hours) | Mixing time the mixture of active material/conductive material and binder-containing solution (in hours) | Aging time (in hours) | Sum (in hours) |
|---|---|---|---|---|
| Comp. Ex. 1 | 1 | 2 | 1 | 4 |
| Ref. Ex. 5 | 1 | 2 | 1 | 4 |
| Ex. 5 | — | 2 | — | 2 |

For the active material powder samples according to Comparative Example 1 and Reference Example 5, it took 4 hours each to prepare the slurry for even mixing of the active material and conductive agent. Conversely, for the active material which is already coated with the conductive agent in Example 5, a uniform slurry was achieved within 2 hours. As shown in Table 1, the coated active material according to the present invention may reduce the slurry preparation time in fabrication of the electrode by as much as 50%. The productivity in fabrication of batteries is expected to be improved even more in a large-scale production.

Figure 5A:
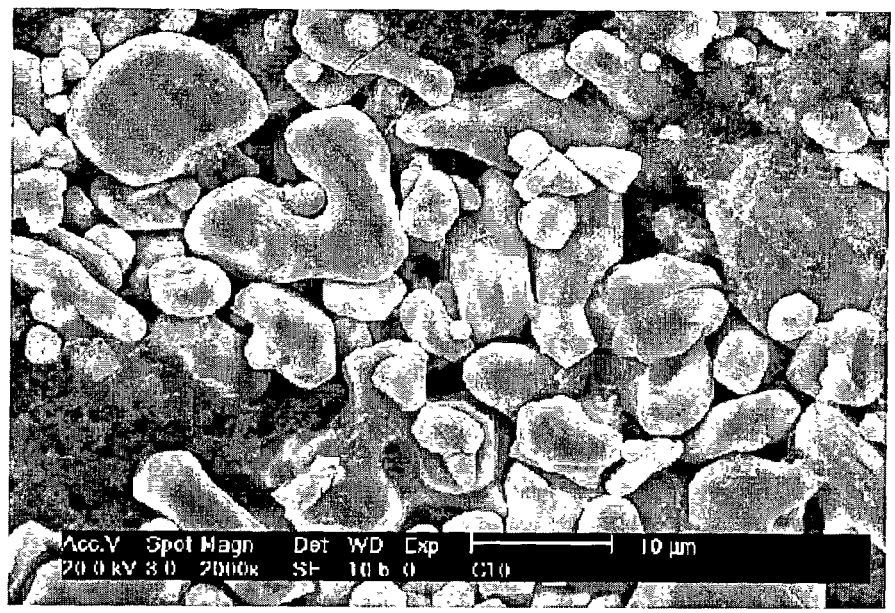
FIGS. 5A and 5B are Scanning Electron Microscopy (SEM) photographs of a positive active material powder in the positive electrodes according to Comparative Example 1 and Example 1 of an embodiment of the present invention, respectively.
Figure 5B:
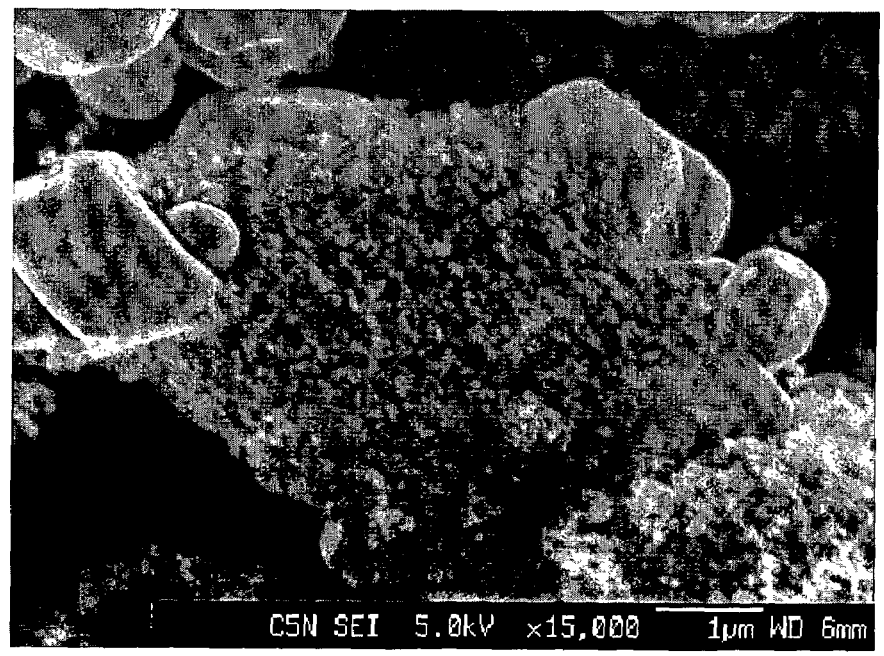

The $LiCoO_2$ active material prepared according to Example 1 of the present invention has a coating (surface-treatment) layer comprising a coating-element-containing compound and a conductive agent, and the Super P on the surface of the active material. SEM photographs of the uncoated (Comparative Example 1) and the coated LiCoO$_2$ (Example 1) in the positive electrode samples are shown in FIGS. 5A and 5B, respectively. In FIG. 5A, the Super P is non-uniformly distributed amongst the LiCoO$_2$ powder. On the other hand, in FIG. 5B, the Super P is uniformly distributed on the surface of the LiCoO$_2$ powder, resulting in a more uniform distribution of the Super P in the electrode than one prepared using the uncoated LiCoO$_2$ powder and the Super P.

Figure 6A:
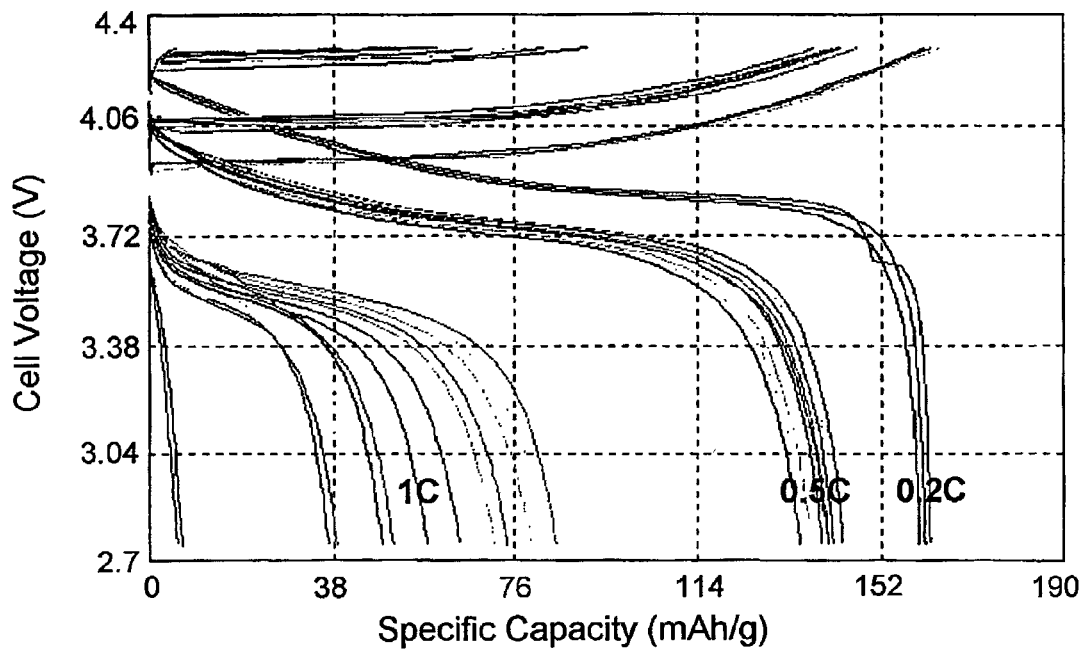
FIGS. 6A and 6B are graphs showing the capacity and the voltage performances at rates of 0.2C, 0.5C, and 1C for battery cells according to Reference Example 5 and Example 5 of an embodiment of the present invention, respectively.
Figure 6B:
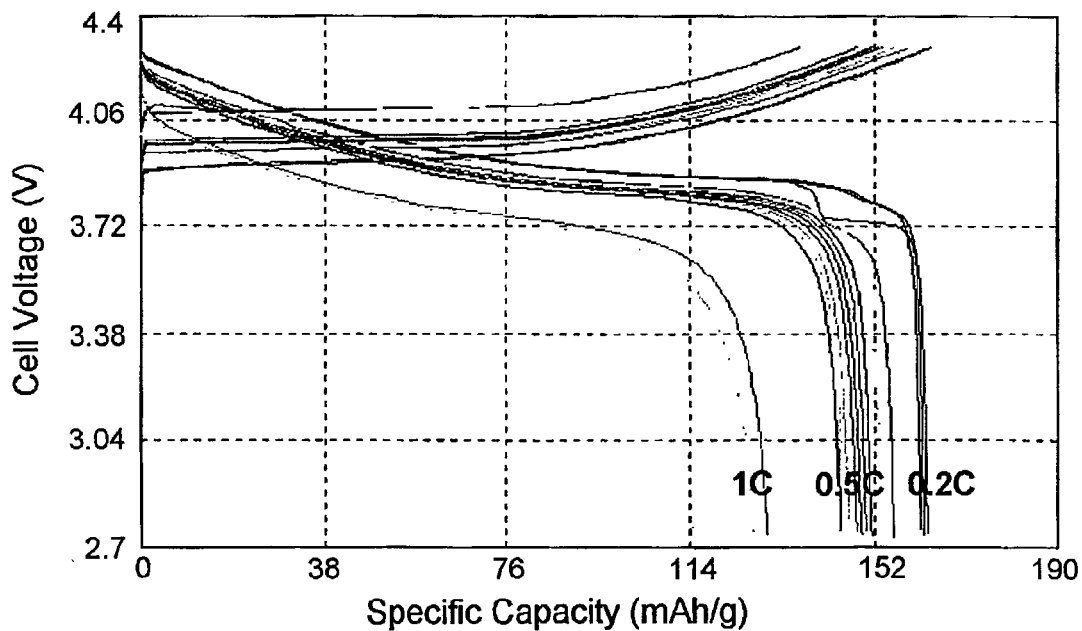
Figure 7:
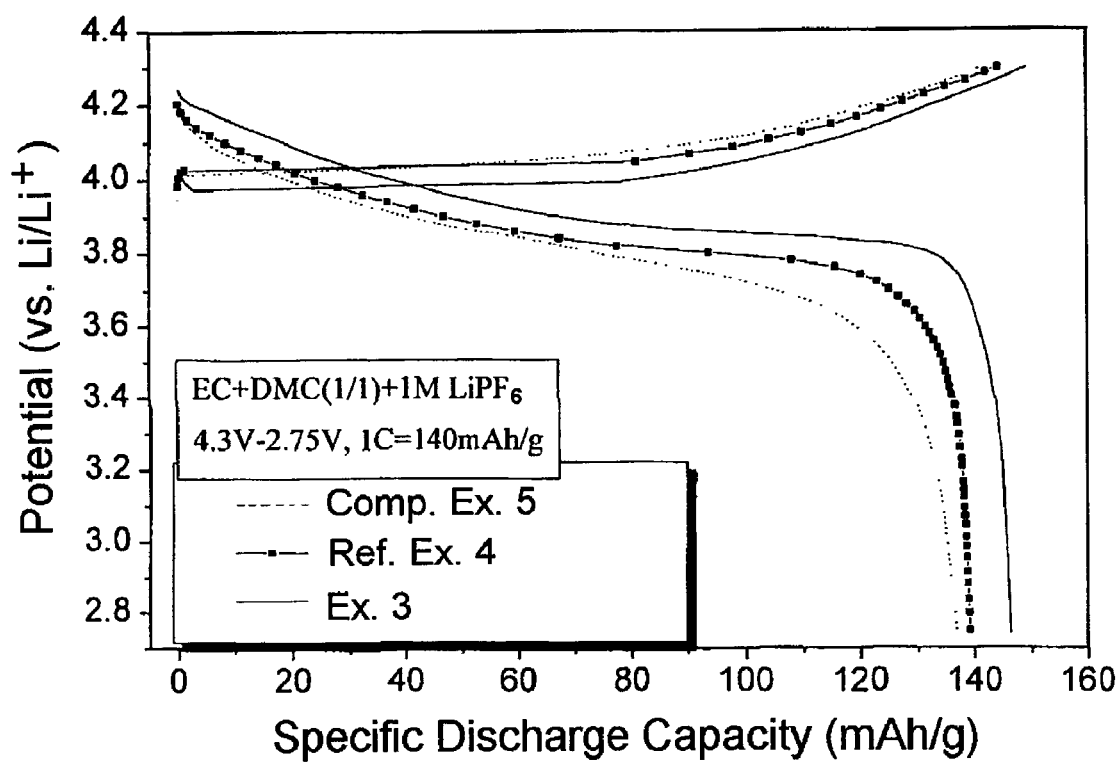
FIG. 7 is a graph showing charge-discharge characteristics for battery cells at 1C rate according to Comparative Example 5, Reference Example 4, and Example 3 of an embodiment of the present invention.

In order to evaluate the capacity characteristics of the coin-type half-cells of Comparative Examples, Reference Examples, and Examples at various rates, the cells were charged-discharged in the voltage range of 4.3 to 2.75 V. Results of the charge-discharge characteristics at various charge and discharge rates (0.2C, 0.5C, 1C) of Reference Example 5 and Example 5 are shown in FIGS. 6A and 6B respectively. The LiCoO$_2$ powder of Example 5, with a coating layer of AlO(OH) and Super P conductive agent, are superior in charge and discharge characteristics to the LiCoO$_2$ powder of Reference Example 5 with a coating layer of AlO(OH) only. When the charge and discharge rate is increased from a low rate (0.2 C) to a high rate (1.0 C), the superiority is especially pronounced. In addition, the discharge characteristics of Comparative Example 5, Reference Example 4, and Example 3 at a high rate (1C) indicate that the discharge characteristics of the cell of Example 3 is significantly better than those of Comparative Example 5 and Reference Example 4 as shown in FIG. 7.

Figure 8:
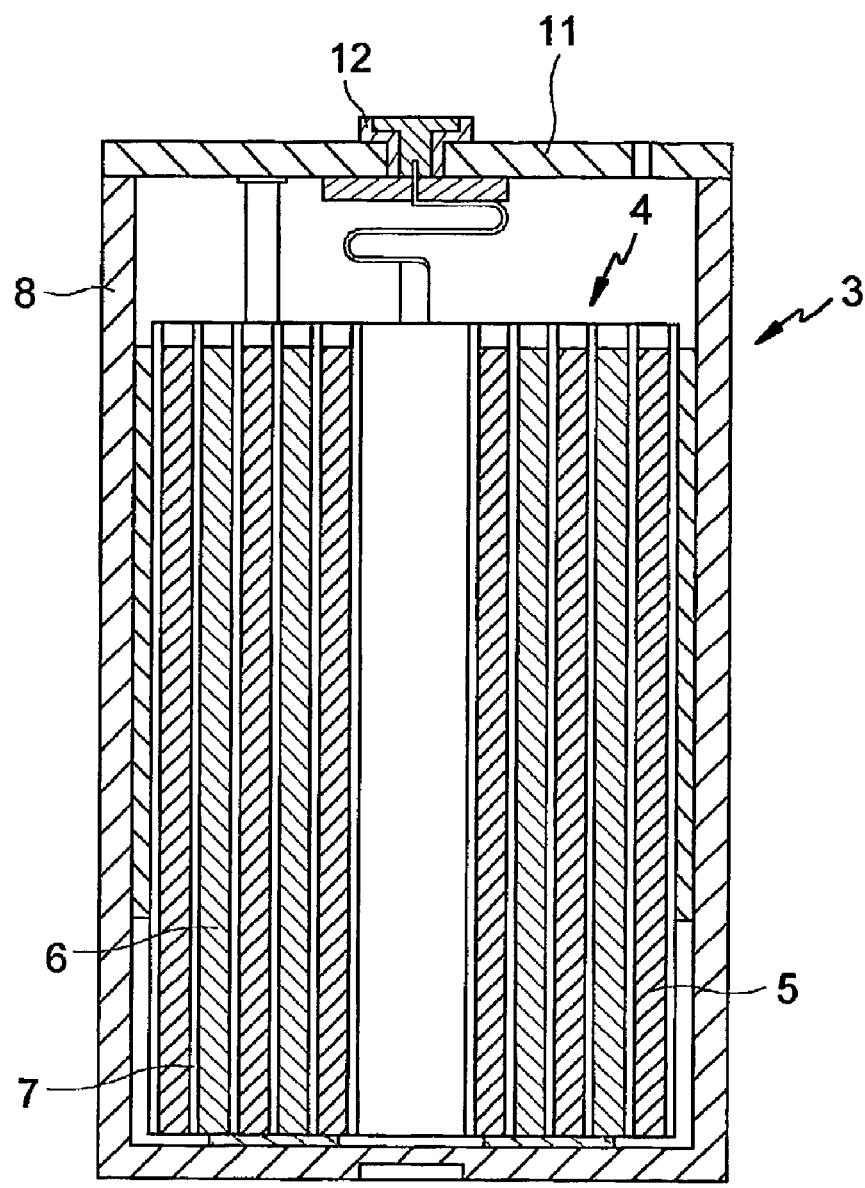
FIG. 8 is a cross-sectional view of a prismatic Li-ion cell according to an embodiment of the invention.

FIG. 8. shows a cross-sectional view of a prismatic Li-ion cell according to an embodiment of the invention. The prismatic Li-ion cell 3 is fabricated by inserting an electrode assembly 4 including a positive electrode 5, a negative electrode 6, and a separator 7 between the positive and negative electrodes into a battery case 8. An electrolyte is injected therein and the upper part of the case 8 is sealed with a cap plate 11 and a gasket 12. It is understood that other types of batteries can be constructed using the coated active material of the present invention.

The positive electrode 5 of the sample Li-ion cells was prepared by the same electrode preparation method as described in Example 1 or Comparative Example 1. A negative electrode 6 of the sample Li-ion cells was prepared by casting a slurry including the negative active material on a Cu foil. The slurry containing negative active material was prepared by mixing an artificial graphite powder as the negative active material and a polyvinylidene fluoride as a binder material in the weight ratio of 92:8 in an NMP. For the electrolyte, a 1 M LiPF$_6$ solution in a mixed solvent of ethylene carbonate and dimethyl carbonate in the volume ratio of 1:1 was used.

Figure 9:
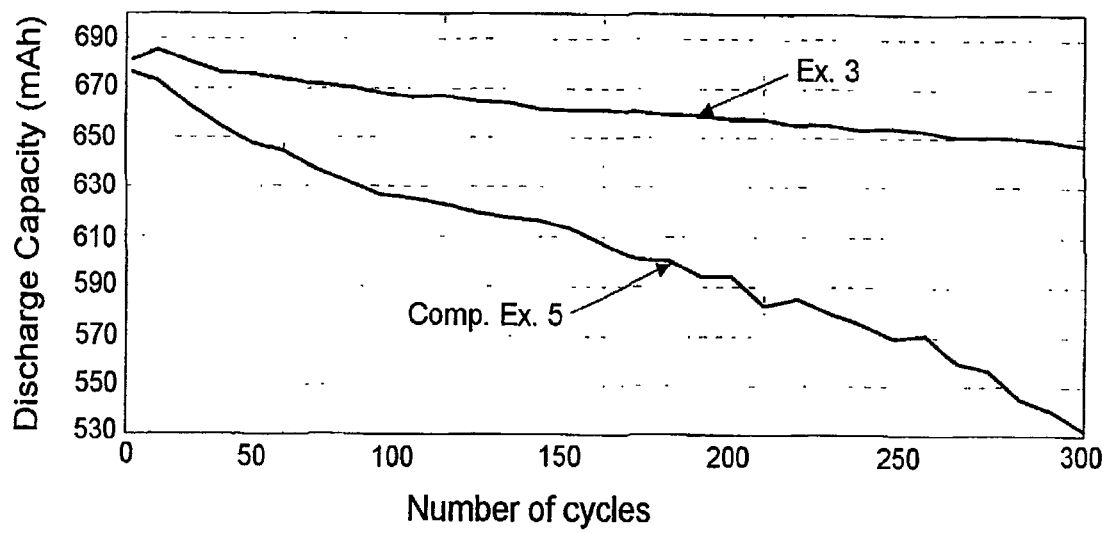
FIG. 9 is a graph showing cycle life characteristics at 1C rate for the prismatic Li-ion cells comprising active materials prepared in Comparative Example 5 and Example 3 of an embodiment of the present invention.

Prismatic Li-ion cells of a nominal capacity of 670 mAh comprising the positive active materials prepared in Examples 3 and Comparative Example 5 were charged-discharged at 1 C rate in the voltage range of 4.2 to 2.75 V in order to evaluate their cycle life characteristics. The results of cycle life tests of these cells are shown in FIG. 9. As indicated in FIG. 9, the positive active material of Example 3 has superior cycle-life characteristics to those of Comparative Example 5 during 300 charge-discharge cycles.

Figure 10:
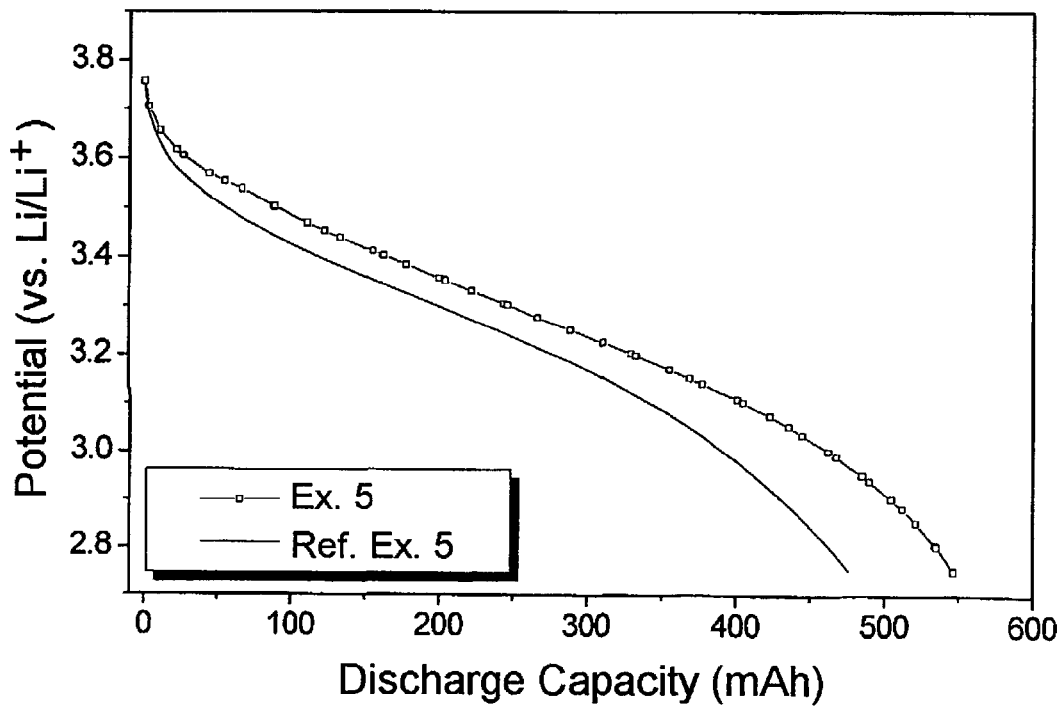
FIG. 10 is a graph showing discharge characteristics at a low temperature of −20° C. at 0.2C rate for the prismatic Li-ion cells comprising active materials prepared in Reference Example 5 and Example 5 of an embodiment of the present invention.

FIG. 10 shows discharge characteristics at a low temperature of −20° C. of the 670-mAh prismatic Li-ion cells fabricated as described above, but using the positive active materials of Reference Example 5 and Example 5. As shown in FIG. 10, the cell containing the active material from Example 5 shows an improved capacity by about 80 mAh over the cell containing the active material from Reference Example 5.

In order to evaluate thermal stability of the positive active material prepared according to Example 5 of the present invention and Comparative Example 5, DSC analyses were performed. Specifically, the coin-type half cell fabricated in Example 5 and Comparative Example 5 were charged using a voltage cut-off at 4.3V. About 10-mg portions of the positive active material from charged electrodes from each cell were removed for the DSC tests. DSC analyses were carried out in a sealed aluminum can using scanning temperatures from 100 to 300° C. at the rate of 3° C./min using a 910 DSC (produced by TA INSTRUMENTS Inc.) instrument. The results are shown in FIG. 11.

Figure 11:
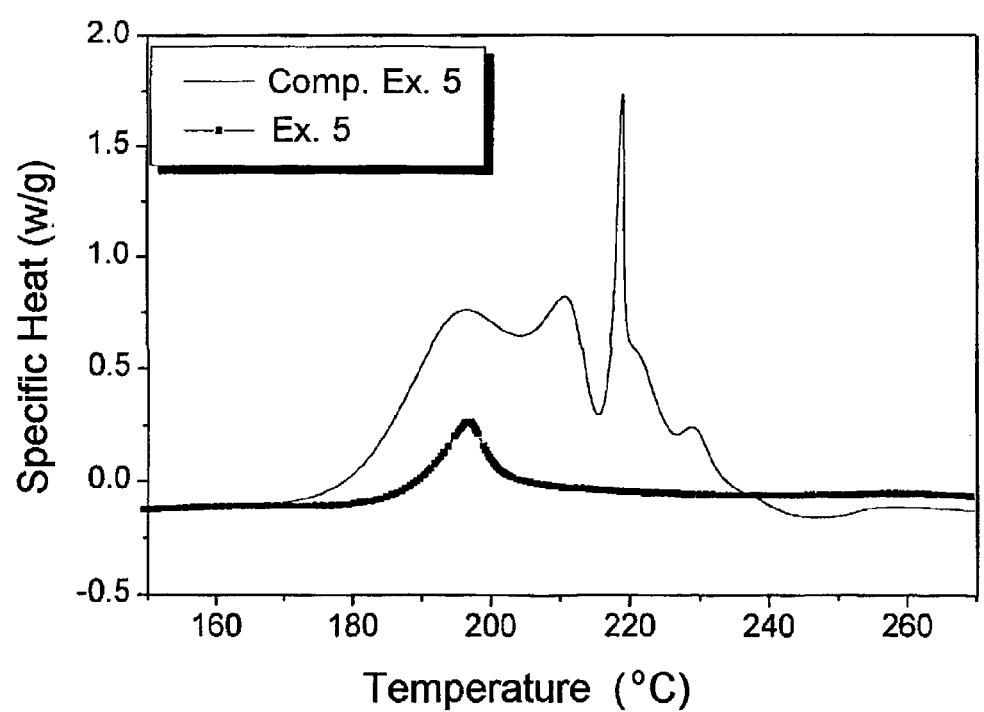
FIG. 11 shows the results of Differential Scanning Calorimetry (DSC) of active materials obtained from charged (4.3 V) prismatic Li-ion cells comprising active materials prepared in Comparative Example 5 and Example 5 of an embodiment of the present invention.

As shown in the FIG. 11, Comparative Example 5 (uncoated LiCoO$_2$) showed a large exothermic peak in the temperature range of 190 to 220° C. as a result of 02 release from the breakage of Co—O bonds of charged Li$_{1-x}$CoO$_2$ followed by an exothermic reaction of the oxygen with the electrolyte. This phenomenon can cause of safety problems for a Li-ion cell. However, in the case of Example 5, the exothermic peak in the DSC was reduced to a negligible size, strongly suggesting that the thermal stability and, therefore, the safety of the batteries using the active material of Example 5 will be much better than that of Comparative Example 5.

Five 670-mAh prismatic Li-ion cells comprising the positive active material from Comparative Example 1 and the positive active materials prepared in Reference Example 5 and Example 5 were tested for an overcharge safety test at 1 C rate. The sample Li-ion cells were fabricated as described above. The overcharge test was carried out by observing changes of the sample cells that were overcharged at 1C rate for 150% of the nominal capacity. The results are presented in Table 2.

TABLE 2

|  | Comp. Ex. 1 | Ref. Ex. 5 | Ex. 5 |
|---|---|---|---|
| Overcharge test at 1 C rate | 3L2, 2L1 | 5L1 | 5L0 |

Note:
The number preceding "L" indicates the number of tested cells and the number following "L" indicates level of safety.

The results of the safety test were rated as follows: L0: no leakage, L1: a visual sign of leakage, and L2: an electrolyte flame without thermal runaway.

As shown in Table 2, the positive active material of Example 5 shows much improved safety over those of Reference Example 5 and Comparative Example 1.

In order to see the adhesion strength of the active material composite to the current collector for the electrode samples, a peeling test was performed with the electrodes from Comparative Example 1, Reference Example 2, and Example 2, respectively, before and after compression. The results are shown in Table 3.

TABLE 3

|  | Comp. Ex. 1 gf/cm | Ref. Ex. 2 gf/cm | Ex. 2 gf/cm |
|---|---|---|---|
| Before compression | UM | UM | 4–6 |
| After compression | 1–2 | 2–4 | 12–18 |

Note:
UM in Table 3 indicates "incapability of measurement since the adhesion strength of the cast slurry film to the current collector is too weak to measure quantitatively."

As shown in Table 3, the electrode prepared using the positive active material of Example 2 shows an adhesion strength at least four times as high as those prepared using the positive active material of Comparative Example 1 and Reference Example 2. As the adhesion strength is improved between the active material and current collector, the detachment of the active material from the current collector during charge-discharge cycles will be prevented, resulting in a reduced change in internal resistance of the cell with cycling.

Since the active material coated with a coating-element-containing compound and a conductive agent gives an improved adhesion strength of the active material composite to the current collector, a reduced amount of the binder material may be used to achieve an adequate adhesion strength for a Li-ion cell. Therefore, an increased proportion of the active material may be used in the cell by the present invention, which improves energy density and specific energy of the cell. In addition, through proportional reduction of the binder quantity, a saving of the material cost may also be realized by the use of the present invention.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. An active material for a battery, comprising:
   a material that undergoes reversible electrochemical oxidation-reduction reactions and having a surface; and
   a surface treatment layer on the surface and comprising:
      a conductive agent, and
      at least one coating-element-containing compound selected from the group consisting of a coating-element-containing hydroxide, a coating-element-containing oxyhydroxide, a coating-element-containing oxycarbonate, a coating-element-containing hydroxycarbonate, and a mixture thereof,
   wherein said material is selected from the group consisting of a compound that reversibly forms a lithium-containing compound by a reaction with lithium ions, a material that reversibly intercalates/deintercalates lithium ions and a lithiated intercalation compound, and
   wherein the lithiated intercalation compound is selected from the group consisting of a lithium-containing metal oxide, a lithium-containing chalcogenide compound, and a carbon-based material.

2. The active material of claim 1, wherein the coating element is soluble in an organic solvent or water.

3. The active material of claim 2, wherein the coating element is at least one selected from the group consisting of an alkali metal, an alkaline earth metal, a group 13 element of the Periodic Table, a group 14 element of the Periodic Table, a group 15 element of the Periodic Table, and a transition metal.

4. The active material of claim 3, wherein the coating element is at least one selected from the group consisting of Mg, Al, Co, K, Na, Ca, Si, Ti, B, As, Zr, Sn, V, Ge, Ga, and a combination thereof.

5. The active material of claim 1, wherein the coating-element-containing compound has either an amorphous or a crystalline phase.

6. The active material of claim 1, wherein a thickness of said surface-treatment layer is 1 to 300 nm.

7. The active material of claim 6, wherein a thickness of said surface-treatment layer is 1 to 100 nm.

8. The active material of claim 1, wherein an amount of the coating element is $2 \times 10^{-5}$ to 2% by weight of the active material.

9. The active material of claim 8, wherein the amount of the coating element is 0.001 to 2% by weight of the active material.

10. The active material of claim 1, wherein the conductive agent is at least one material selected from the group consisting of a carbon-based conductive agent, a graphite-based conductive agent, a metal-based conductive agent, and a metallic-compound-based conductive agent.

11. The active material of claim 1, wherein an amount of the conductive agent is 0.5 to 10% by weight of the active material.

12. The active material of claim 11, wherein the amount of the conductive agent is 1 to 5% by weight of the active material.

13. The active material of claim 1, wherein the coating element comprises Al, and
   the surface treatment layer on the surface comprises the conductive agent and an Al-containing compound selected from the group consisting of an Al-containing hydroxide, an Al-containing oxyhydroxide, an Al-containing oxycarbonate, an Al-containing hydroxycarbonate, and a mixture thereof.

14. The active material of claim 13, wherein the surface treatment layer is coated on the surface by a method comprising:
   adding the conductive agent and the coating-element source to a solvent selected from the group consisting of water, organic solvent, and a mixture thereof to prepare a coating liquid;
   adding the material to the coating liquid to coat the material; and
   drying the coated material to form the surface-treatment layer comprising the conductive agent and the at least one coating-element-containing compound selected from the group consisting of the coating-element-containing hydroxide, the coating-element-containing oxyhydroxide, the coating-element-containing oxycarbonate, the coating-element-containing hydroxycarbonate, and the mixture thereof.

15. The active material of claim 1, wherein an average particle size of said material is 1 to 50 μm.

16. The active material of claim 15, wherein the average particle size is 5 to 20 μm.

17. The active material of claim 1, wherein the active material is prepared by:
   adding the conductive agent and the coating-element source to a solvent selected from the group consisting of water, organic solvent, and a mixture thereof to prepare a coating liquid;
   adding the material to the coating liquid to coat the surface of the material; and
   drying the coated material to form the surface-treatment layer comprising the conductive agent and the at least one coating-element-containing compound selected from the group consisting of the coating-element-containing hydroxide, the coating-element-containing oxyhydroxide, the coating-element-containing oxycarbonate, the coating-element-containing hydroxycarbonate, and the mixture thereof.

18. The active material of claim 17, wherein the material to be coated is selected from the group consisting of a metal, a lithium-containing alloy, a compound that reversibly forms a lithium-containing compound by a reaction with lithium ions, a material that reversibly intercalates/deintercalates the lithium ions and a lithiated intercalation compound.

19. The active material of claim 18, wherein the material is the lithiated intercalation compound that is selected from the group consisting of a lithium-containing metal oxide, a lithium-containing chalcogenide compound, and a carbon-based material.

20. The active material of claim 18, wherein the material is the lithiated intercalation compound that is at least one selected from the group consisting of a lithium compound with the following formulas (1) to (13):

| | |
|---|---|
| $Li_xMn_{1-y}M_yA_2$ | (1) |
| $Li_xMn_{1-y}M_yO_{2-z}X_z$ | (2) |
| $Li_xMn_2O_{4-z}X_z$ | (3) |
| $Li_xMn_{2-y}M_yA_4$ | (4) |
| $Li_xCo_{1-y}M_yA_2$ | (5) |
| $Li_xCo_{1-y}M_yO_{2-z}X_z$ | (6) |
| $Li_xNi_{1-y}M_yA_2$ | (7) |
| $Li_xNi_{1-y}M_yO_{2-z}X_z$ | (8) |
| $Li_xNi_{1-y}Co_yO_{2-z}X_z$ | (9) |
| $Li_xNi_{1-y-z}Co_yM_zA_\alpha$ | (10) |
| $Li_xNi_{1-y-z}Co_yM_zO_{2-\alpha}X_\alpha$ | (11) |
| $Li_xNi_{1-y-z}Mn_yM_zA_\alpha$ | (12) |
| $Li_xNi_{1-y-z}Mn_yM_zO_{2-\alpha}X_\alpha$ | (13) | wherein
$0.95 \leq x \leq 1.1$; $0 \leq y \leq 0.5$; $0 \leq z \leq 0.5$; $0 \leq \alpha \leq 2$;
M is at least one element selected from the group consisting of Al, Ni, Co, Mn, Cr, Fe, Mg, Sr, V, and rare earth elements;
A is at least one element selected from the group consisting of O, F, S, and P; and
X is at least one element selected from the group consisting of F, S, and P.

21. The active material of claim 17, wherein the coating element is soluble in an organic solvent or water.

22. The active material of claim 21, wherein the coating element is at least one selected from the group consisting of an alkali metal, an alkaline earth metal, a group 13 element of the Periodic Table, a group 14 element of the Periodic Table, a group 15 element of the Periodic Table, and a transition metal.

23. The active material of claim 22, wherein the coating element is at least one selected from the group consisting of Mg, Al, Co, K, Na, Ca, Si, Ti, B, As, Zr, Sn, V, Ge, Ga, and a combination thereof.

24. The active material of claim 17, wherein an amount of the coating-element source is 0.1 to 50% by weight of the coating liquid.

25. The active material of claim 24, wherein the amount of the coating-element source is 5 to 30% by weight of the coating liquid.

26. The active material of claim 17, wherein said adding the coating liquid to coat the material and said drying the coated material comprises mixing a mixture of the material with the coating liquid while heating the mixture of the material and the coating liquid by increasing a temperature of the mixture.

27. The active material of claim 24, wherein said mixing of the mixture further comprises mixing under one of a vacuum condition and a condition of injecting purging gas, while increasing the temperature.

28. The active material of claim 17, further comprising sieving the dried coated material through a sieve.

29. The active material of claim 17, wherein the adding the material to the coating liquid comprises:
mixing the material and the coating liquid to coat the material while removing the added solvent so as to produce the surface-treatment layer on the material, the produced surface-treatment layer comprising the conductive agent and the at least one coating-element-containing compound selected from the group consisting of the coating-element-containing hydroxide, the coating-element-containing oxyhydroxide, the coating-element-containing oxycarbonate, the coating-element-containing hydroxycarbonate, and the mixture thereof.

30. The active material of claim 29, wherein said adding the conductive agent and the coating-element source to the solvent further comprises forming the coating liquid as one of a solution and a suspension.

31. The active material of claim 30, wherein the conductive agent and the coating-element source are added to the solvent using a reflux method.

32. The active material of claim 29, wherein the coating-element source comprises an Al-containing source.

33. The active material of claim 29, wherein the coating-element source comprises a B-containing source.

34. The active material of claim 29, wherein said mixing the material and the coating liquid to coat the material while removing the added solvent comprises:
adding the material and the coating liquid to a mixing vessel,
mixing the material and the coating liquid in the mixing vessel to coat the material with the coating liquid,
transferring the coated material to a tray, and
drying the coated material while in the tray to remove the solvent to produce the surface-treatment layer.

35. The active material of claim 29, wherein said mixing the material and the coating liquid to coat the material while removing the added solvent comprises:
adding the material and the coating liquid to a mixing vessel, and
mixing the material and the coating liquid in the mixing vessel to coat the material while removing the solvent.

36. The active material of claim 35, wherein said mixing the material and the coating liquid to coat the material further comprises raising a temperature of the mixing vessel while mixing the material and the coating liquid to coat the material and to evaporate the solvent.

37. The active material of claim 36, wherein said mixing the material and the coating liquid to coat the active material further comprises introducing a purging gas to the mixing vessel to evaporate the solvent and to remove impure gasses from the mixing vessel.

38. The active material of claim 37, wherein the purging gas comprises $CO_2$, $N_2$, Ar, or any inert gas.

39. The active material of claim 36, wherein the raising the temperature comprises raising the temperature to at or between 50 and 100° C.

40. The active material of claim 39, wherein the raising the temperature comprises circulating warm liquid around an exterior wall of the mixing vessel.

41. The active material of claim 34, wherein the drying the coated material comprises drying at a temperature at or between room temperature and 200° C. for at or between 1 and 24 hours.

42. An active material for a battery, comprising:
a material that undergoes reversible electrochemical oxidation-reduction reactions and having a surface; and
a surface treatment layer on the surface and comprising:
a conductive agent, and
at least one coating-element-containing compound selected from the group consisting of a coating-element-containing hydroxide, a coating-element-containing oxyhydroxide, a coating-element-containing oxycarbonate, a coating-element-containing hydroxycarbonate, and a mixture thereof, wherein said material is selected from the group consisting of a compound that reversibly forms a lithium-containing compound by a reaction with lithium ions, a material that reversibly intercalates/deintercalates lithium ions and a lithiated intercalation compound, wherein the lithiated intercalation compound being at least one selected from the group consisting of a lithium compound with the following formulas (1) to (13):

$$Li_xMn_{1-y}M_yA_2 \quad (1)$$
$$Li_xMn_{1-y}M_yO_{2-z}X_z \quad (2)$$
$$Li_xMn_2O_{4-z}X_z \quad (3)$$
$$Li_xMn_{2-y}M_yA_4 \quad (4)$$
$$Li_xCo_{1-y}M_yA_2 \quad (5)$$
$$Li_xCo_{1-y}M_yO_{2-z}X_z \quad (6)$$
$$Li_xNi_{1-y}M_yA_2 \quad (7)$$
$$Li_xNi_{1-y}M_yO_{2-z}X_z \quad (8)$$
$$Li_xNi_{1-y}Co_yO_{2-z}X_z \quad (9)$$
$$Li_xNi_{1-y-z}Co_yM_zA_\alpha \quad (10)$$
$$Li_xNi_{1-y-z}Co_yM_zO_{2-\alpha}X_\alpha \quad (11)$$
$$Li_xNi_{1-y-z}Mn_yM_zA_\alpha \quad (12)$$
$$Li_xNi_{1-y-z}Mn_yM_zO_{2-\alpha}X_\alpha \quad (13)$$

wherein
$0.95 \leq x \leq 1.1$; $0 \leq y \leq 0.5$; $0 \leq z \leq 0.5$; $0 \leq \alpha \leq 2$;

M is at least one element selected from the group consisting of Al, Ni, Co, Mn, Cr, Fe, Mg, Sr, V, and rare earth elements;

A is at least one element selected from the group consisting of O, F, S, and P; and X is at least one element selected from the group consisting of F, S, and P.

43. An active material for a battery, comprising:
a material that undergoes reversible electrochemical oxidation-reduction reactions and having a surface; and
a surface treatment layer on the surface and comprising:
a conductive agent, and
at least one coating-element-containing compound selected from the group consisting of a coating-element-containing hydroxide, a coating-element-containing oxyhydroxide, a coating-element-containing oxycarbonate, a coating-element-containing hydroxycarbonate, and a mixture thereof,
wherein said material is selected from the group consisting of a compound that reversibly forms a lithium-containing compound by a reaction with lithium ions, a material that reversibly intercalates/deintercalates lithium ions and a lithiated intercalation compound and wherein the coating element comprises B, and the surface treatment layer on the surface comprises the conductive agent and a B-containing compound selected from the group consisting of a B-containing hydroxide, a B-containing oxyhydroxide, a B-containing oxycarbonate, a B-containing hydroxycarbonate, and a mixture thereof.

44. An electrode for use in a battery, comprising:
a current collector; and
an active material on said current collector, said active material being coated with a layer comprising:
a conductive agent, and
at least one compound selected from the group consisting of a coating-element-containing hydroxide, a coating-element-containing oxyhydroxide, a coating-element-containing oxycarbonate, a coating-element-containing hydroxycarbonate, and a mixture thereof,
wherein said active material is selected from the group consisting of a compound that reversibly forms a lithium-containing compound by a reaction with lithium ions, a material that reversibly intercalates/deintercalates lithium ions and a lithiated intercalation compound and wherein the lithiated intercalation compound is selected from the group consisting of a lithium-containing metal oxide, a lithium-containing chalcogenide compound, and a carbon-based material.

45. A battery comprising:
a first electrode comprising a current collector and a coated active material, the coated active material comprising a layer including a conductive agent and at least one compound selected from the group consisting of a coating-element-containing hydroxide, a coating-element-containing oxyhydroxide, a coating-element-containing oxycarbonate, a coating-element-containing hydroxycarbonate, and a mixture thereof;
an electrolyte; and
a counter electrode spaced apart from said first electrode to perform reversible oxidation-reduction reactions with said first electrode through said electrolyte,
wherein said active material is selected from the group consisting of a compound that reversibly forms a lithium-containing compound by a reaction with lithium ions, a material that reversibly intercalates/deintercalates lithium ions and a lithiated intercalation compound, and
wherein the lithiated intercalation compound is selected from the group consisting of a lithium-containing metal oxide, a lithium-containing chalcogenide compound, and a carbon-based material.

* * * * *

UNITED STATES PATENT AND TRADEMARK OFFICE
CERTIFICATE OF CORRECTION

PATENT NO. : 7,108,944 B2  Page 1 of 1
APPLICATION NO. : 10/189384
DATED : September 19, 2006
INVENTOR(S) : Ho-Jin Kweon et al.

It is certified that error appears in the above-identified patent and that said Letters Patent is hereby corrected as shown below:

Column 26, line 22 claim 44, insert -- , -- after "wherein"

Column 26, line 22 claim 44, start new paragraph after "and"

Signed and Sealed this

Fourth Day of September, 2007

JON W. DUDAS
*Director of the United States Patent and Trademark Office*